(12) United States Patent
Andre, Sr.

(10) Patent No.: US 7,147,232 B2
(45) Date of Patent: Dec. 12, 2006

(54) WORKPIECE HOLDER

(75) Inventor: Eugene R. Andre, Sr., Huntington Woods, MI (US)

(73) Assignee: Hydra-Lock Corporation, Mt. Clemens, MI (US)

( * ) Notice: Subject to any disclaimer, the term of this patent is extended or adjusted under 35 U.S.C. 154(b) by 142 days.

(21) Appl. No.: 10/610,251

(22) Filed: Jun. 30, 2003

(65) Prior Publication Data

US 2004/0262855 A1  Dec. 30, 2004

(51) Int. Cl.
*B23B 31/20* (2006.01)

(52) U.S. Cl. .................. 279/2.05; 279/2.06; 279/4.05; 279/139; 269/48.1; 242/571.1

(58) Field of Classification Search ............... 279/2.05, 279/2.06, 2.07, 2.08, 2.09, 4.03, 4.04, 4.05, 279/139; 269/48.1; 242/571.1, 571.2
See application file for complete search history.

(56) References Cited

U.S. PATENT DOCUMENTS

| | | | | |
|---|---|---|---|---|
| 3,174,765 A | * | 3/1965 | Atherholt, Sr. ............. | 279/4.03 |
| 3,677,559 A | | 7/1972 | Andre et al. | |
| 3,679,219 A | * | 7/1972 | Cameron .................... | 279/4.03 |
| 4,114,909 A | * | 9/1978 | Taitel et al. ............... | 279/2.07 |
| 4,422,653 A | * | 12/1983 | Piotrowski ................. | 279/2.03 |
| 5,429,376 A | * | 7/1995 | Mueller et al. ............ | 279/4.07 |
| 5,516,243 A | | 5/1996 | Laube | |
| 6,015,154 A | | 1/2000 | Andre et al. | |
| 6,077,003 A | * | 6/2000 | Laube ......................... | 409/234 |

* cited by examiner

*Primary Examiner*—Monica Carter
*Assistant Examiner*—Michael W. Talbot
(74) *Attorney, Agent, or Firm*—Reising, Ethington, Barnes, Kisselle, P.C.

(57) ABSTRACT

A workholding apparatus including a body and a drive member carried by the body, so that the drive member and body partially define a fluid chamber therebetween for containing a fluid. A driven member is also carried by the body and includes multiple displacement reliefs therein. An intermediate member with a displacement relief is received between the drive and driven members. The intermediate member prevents the drive member from extruding through the displacement reliefs in the driven member under fluid pressures of the fluid, thereby enabling use of the apparatus under higher performance applications that would not be possible without the intermediate member.

22 Claims, 2 Drawing Sheets

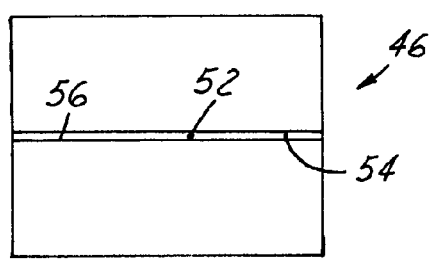
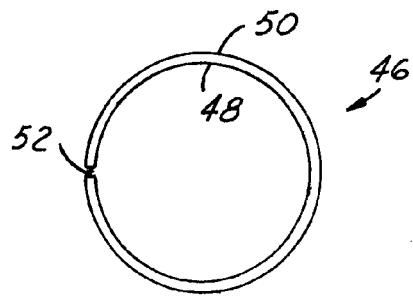
FIG.3  FIG.4
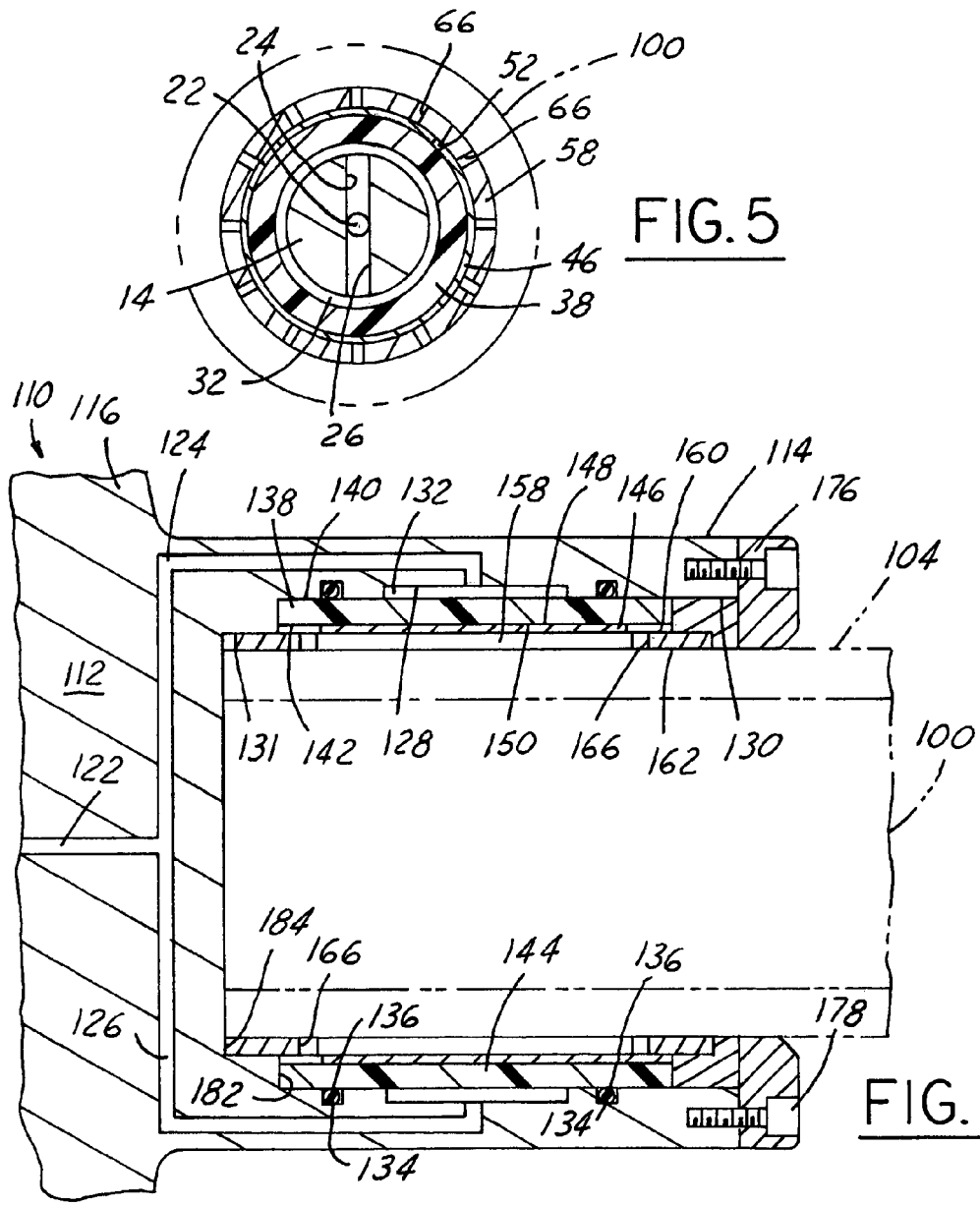
FIG.5
FIG.6

US 7,147,232 B2

WORKPIECE HOLDER

FIELD OF THE INVENTION

This invention relates generally to machine tools and more particularly to hydrostatic workpiece holders.

BACKGROUND OF THE INVENTION

Various hydrostatic workpiece holders are known, such as that disclosed in U.S. Pat. No. 6,015,154, which has one or more chambers containing a fluid which, when pressurized, displace one or more polymeric rings which in turn displace one or more metal sleeves into engagement with a workpiece. While this hydrostatic tool holder is effective and reliable under most conditions, the performance and durability can be improved upon for high performance applications.

SUMMARY OF THE INVENTION

In some high performance applications, a more robust workpiece holder is required because the polymeric rings may become displaced beyond their elastic limits and extrude through portions of the metal sleeves.

A workholding apparatus includes a body and a drive member carried by the body, so that the drive member and body partially define a fluid chamber therebetween for containing a fluid. A driven member is likewise carried by the body, and includes a displacement relief therein. An intermediate member is interposed between the drive and driven members. The drive, driven, and intermediate members are relatively lapped with respect to one another. Accordingly, the intermediate member prevents the drive member from extruding through the displacement relief in the driven member under fluid pressures of the fluid.

In one embodiment, the driven member is disposed about the exterior of an arbor body with the intermediate member, drive member, and associated fluid chamber defined within the driven member and arbor body so that the force of the pressurized fluid in the fluid chamber acts radially outwardly on the driven member to displace or expand the driven member into engagement with the inner surface of a workpiece. In another embodiment, the driven member is received within a bore of a chuck body with the intermediate member, drive member, and associated fluid chamber disposed about the driven member so that the force of the pressurized fluid in the fluid chamber acts radially inwardly on the driven member to displace or contract the driven member into engagement with a workpiece. In each embodiment, the force of the pressurized fluid is transferred through the intermediate and drive members to displace the driven member.

Objects, features, and advantages of this invention include providing a workpiece holder which has a driven member that may be significantly displaced under a relatively low pressure of fluid applied to the driven member to firmly hold a workpiece received adjacent to the driven member, has an intermediate member that prevents a drive member from becoming plastically deformed and extruded through portions of the driven member, can handle higher fluid pressures and provide greater holding power, has longer tool life, has a greater expansion or contraction range, can be used to firmly hold and locate workpieces formed of cast material, can conform to a workpiece which is out of round, dampens vibrations during the machining process, provides a better finish of the part machined, repeatably and reliably holds and locates workpieces, reliably centers each workpiece, may be formed of different thicknesses to accommodate different sized parts, can be displaced generally radially inwardly or radially outwardly and is of relatively simple design and economical manufacture and assembly and has a relatively longer useful life in service.

BRIEF DESCRIPTION OF THE DRAWINGS

These and other objects, features and advantages of this invention will be apparent from the following detailed description of the preferred embodiments and best mode, appended claims, and accompanying drawings in which:

FIG. 3 is a side view of a baffle of the arbor of FIG. 1;

FIG. 4 is an end view of the baffle of FIG. 3;

FIG. 5 is a cross-sectional view of the arbor of FIG. 1 taken along line 5—5; and FIG. 6 is a cross-sectional view of a chuck embodying the present invention.

DETAILED DESCRIPTION OF THE PREFERRED EMBODIMENTS

Figure 1:
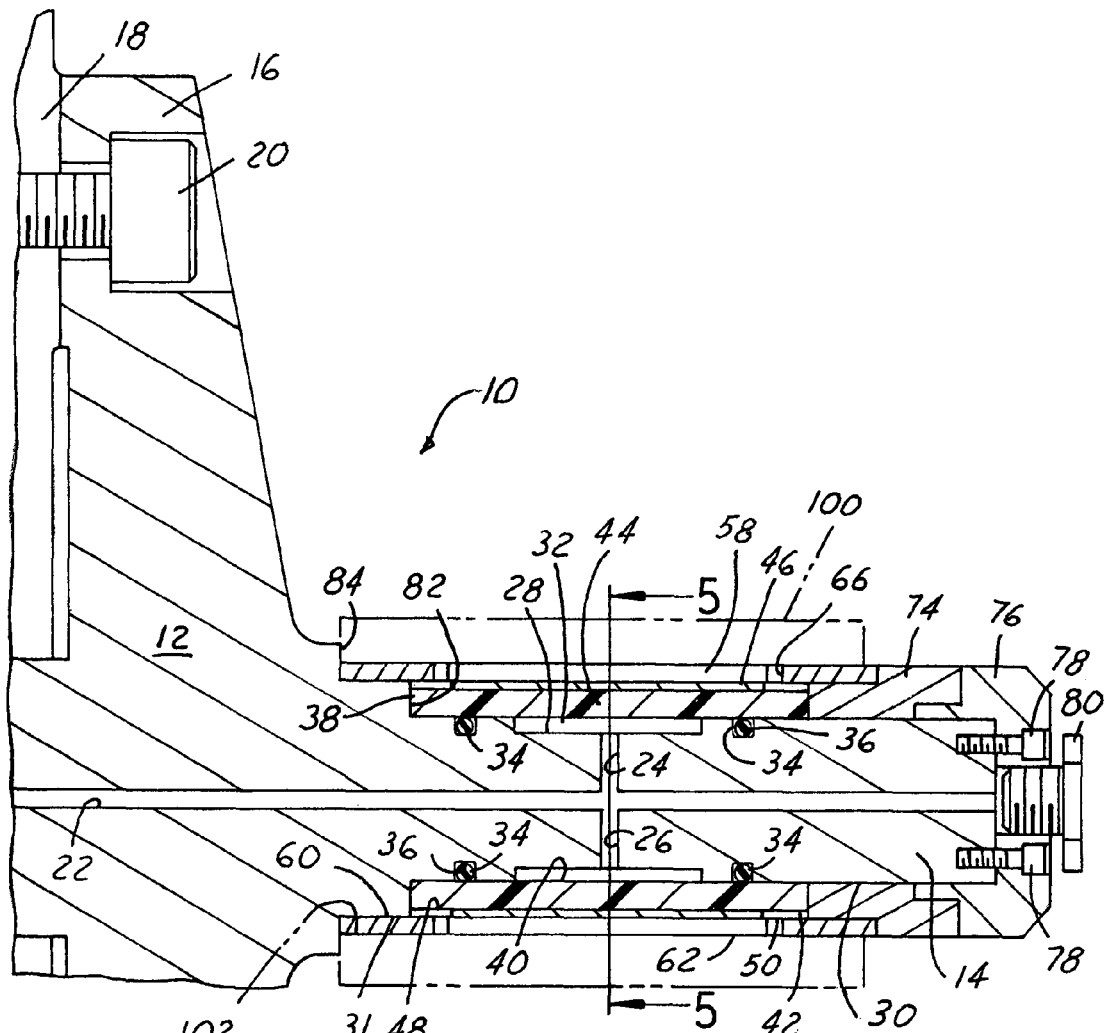
FIG. 1 is a cross-sectional view of an arbor embodying the present invention.

Referring in detail to the drawings, FIG. 1 illustrates a hydrostatic workpiece holder, and more specifically, a hydrostatic arbor 10. The arbor 10 includes a body 12 having a cylindrical shaft or mandrel portion 14 and a radially extending mounting flange portion 16. The body 12 is constructed to be mounted on a machine tool spindle 18 by suitable cap screws 20 as shown. The body 12 includes a main fluid passage 22 and branch fluid passages 24, 26 that are constructed to be filled with a pressurized fluid. As is well known in the art, the main fluid passage 22 is supplied with pressurized fluid from a pump carried by the body 12 or through the machine tool spindle 18 by a remote pump. An external annular recess 28 in a first outer diameter or first outer surface 30 of the mandrel portion 14 of the body 12 partially defines a fluid chamber 32 that is sealed by resilient polymeric rings 34, such as O-rings, that are disposed within annular grooves 36 in the mandrel portion 14. The mandrel portion 14 is stepped to include the first outer surface 30 and a larger, second outer diameter or outer surface 31.

A circumferentially continuous sleeve or diaphragm 38 is adjacent to and circumscribes the mandrel portion 14 of the body 12 and thereby partially defines the fluid chamber 32. The diaphragm 38 includes an inner cylindrical surface 40 that cooperates with the first outer surface 30 of the mandrel portion 14 of the body 12 and further includes an oppositely disposed outer cylindrical surface 42. The diaphragm 38 may be manufactured by injection molding, machined from a solid block, and the like, and may be composed of a polymeric material such as Delrin®, Nylon®, polyurethane, or the like. In any case, the diaphragm 38 is composed of any material that permits radially outward displacement of a mid-section 44 of the diaphragm 38 under the fluid pressure force acting thereon, yet enables the diaphragm 38 to retain surface contact with the polymeric rings 34.

A metal sleeve, retainer, or baffle 46 is adjacent to and circumscribes the diaphragm 38. The baffle 46 includes a diaphragm engaging cylindrical inner surface 48 that cooperates with the outer cylindrical surface 42 of the diaphragm 38 and further includes an oppositely disposed collet engaging surface or outer surface 50. Alternatively, the baffle 46 may be located within an exterior annular relief (not shown)

of the diaphragm 38 such that the baffle 46 and diaphragm 38 share a common outside diameter. Typically, the baffle 46 has a uniform wall thickness of 0.008" to 0.010" but may include any other suitable wall thickness for any given arbor design. Referring now to FIGS. 3 and 4, the baffle 46 is a split sleeve with a displacement slot 52 to permit the baffle 46 to expand radially outwardly. The baffle 46 may be rolled from a flat strip of stainless steel, cold rolled steel, aluminum, copper, or the like in order to define the displacement relief as a slot or gap between two ends 54, 56 of the rolled strip of material as shown. Alternatively, the baffle 46 may be constructed from tube stock and the displacement slot 52 may be cut therefrom. The displacement slot 52 extends parallel to the longitudinal axis of the baffle 46 and, as shown, is a single gap slot or void. While a single slot 52 is preferred, it is contemplated that multiple circumferentially spaced apart slots could be incorporated for use as displacement reliefs, as is known in the art of collet design. Nonetheless, the baffle 46 is composed of a material and constructed in a manner that permits outward radial displacement thereof.

Referring again to FIG. 1, a split sleeve or collet 58 is adjacent to and circumscribes the baffle 46. Accordingly, the collet 58, baffle 46, and diaphragm 38 are in a relatively lapped relationship. The collet 58 includes an inner surface 60 that engages the outer surface 50 of the baffle 46 and the second outer surface 31 of the body 12. The collet 58 further includes an oppositely disposed outer surface 62. Alternatively, the collet 58 may include an internal annular relief (not shown) for capturing the baffle 46 such that the baffle 46 and collet 58 share a common inside diameter.

Figure 2:
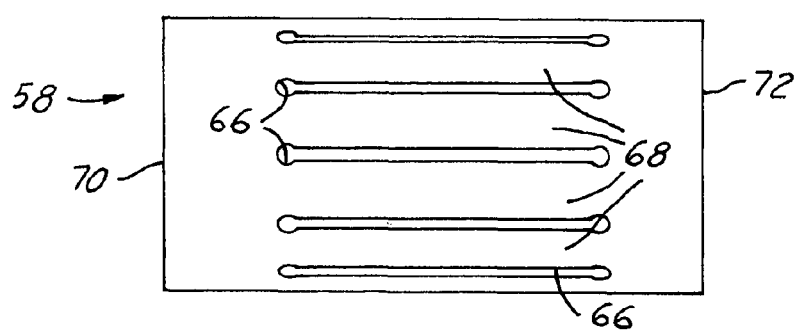
FIG. 2 is a side view of a collet of the arbor of FIG. 1.

As shown in FIG. 2, the collet 58 is generally tubular or cylindrical and includes a plurality of circumferentially spaced and longitudinally extending through slots or displacement reliefs 66 formed therein such as by milling or electro-discharge machining. The reliefs 66 may be bounded by bearing sections 68 of the collet as shown, or may be formed into the ends 70, 72 of the collet 58 as is well known in the art of collet design. The reliefs 66 sufficiently weaken the collet 58 for facilitating radial displacement of at least the bearing sections 68 of the collet 58. The collet 58 may be composed of a metal such as hardened SAE 4130 or any other suitable metal. Nevertheless, the collet 58 is composed of a material and constructed in a manner to permit outward radial displacement thereof.

Referring to FIG. 1, a retainer ring 74 is adjacent to and circumscribes the mandrel portion 14 of the body 12 just outboard of the collet 58. The retainer ring 74 is composed of a metal such as heat treated SAE 6150, but may be composed of any other suitable material. A nose piece 76 circumscribes and caps the mandrel portion 14 of the body 12. The nose piece 76 is held to the body 12 by cap screws 78 that are threaded into the end of the mandrel portion 14 of the body 12. A set screw 80 threads into the nose piece 76 to close off the main fluid passage 22. The nose piece 76 is composed of heat treated SAE 6150, but may be composed of any other suitable material.

In assembly, the polymeric rings 34 are stretched over the mandrel portion 14 of the body 12 and positioned into the annular grooves 36, as shown in FIG. 1. The diaphragm 38 is then telescoped or assembled coaxially over the end of the mandrel portion 14 in abutment with a first shoulder 82 of the mandrel portion 14 of the body 12 and in sealing engagement with the resilient polymeric rings 34 to compress the rings 34 and seal the fluid chamber 32. The baffle 46 is then assembled over the diaphragm 38 and longitudinally centered thereon. The collet 58 is then assembled over the baffle in abutment with a second shoulder 84 of the mandrel portion 14 of the body 12. Referring now to FIG. 5, the collet 58 is angularly oriented or clocked with respect to the baffle 46 such that the displacement slot 52 in the baffle is clocked between adjacent displacement reliefs 66 in the collet 58. As shown in FIG. 1, the retainer ring 74 is assembled over the end of the mandrel portion 14 of the body 12. Finally, the nose piece 76 is assembled over the end of the mandrel portion 14 of the body 12 and abuts the retainer ring 74 as shown. The cap screws 78 are then threaded through the end of the nose piece 76 and into the end of the mandrel portion 14 to secure the assembly together. Accordingly, the mandrel portion 14 of the body 12 carries thereon the various assembled components described above to constitute the arbor 10.

In use, a workpiece 100 is disposed over the outer surface 62 of the collet 58 until the workpiece 100 engages the second shoulder 84 of the body 12. The workpiece 100 may be a cast iron sleeve, a gear blank, or any other workpiece suitable for mounting on an arbor. A cast iron sleeve such as a cylinder liner for an engine has relatively rough surfaces and significant variations in inside and outside diameter. Thus, a relatively large displacement of the collet 58 is required to firmly hold and accurately locate such workpieces on the arbor 10.

To firmly hold the workpiece 100 on the arbor 10, fluid under pressure is provided from an external or internal source through the main fluid passage 22 and branch fluid passages 24, 26 and into the fluid chamber 32. The force of the pressurized fluid radially outwardly displaces the resilient diaphragm 38 which firmly engages and radially outwardly displaces the baffle 46 which, in turn, firmly engages and radially outwardly displaces the collet 58 to urge the collet 58 into firm engagement with an inner surface 102 of the workpiece 100 to firmly hold and accurately locate the workpiece 100 for machining operations to be performed thereon. To remove the workpiece 100 after machining operations, the pressure of the fluid supplied to the fluid chamber 32 is decreased, thereby decreasing the pressure of the fluid in the fluid chamber 32 to thereby relax the diaphragm 38, baffle 46, and collet 58. Thus, the diaphragm 38 acts as a drive member to radially outwardly urge a driven member (collet 58) into engagement with the workpiece 100 and the baffle 46 is an intermediate member to prevent the relatively softer diaphragm material from extruding through the reliefs 66 in the collet 58.

Referring now to a second embodiment, FIG. 6 illustrates a hydrostatic workpiece holder, and more specifically, a hydrostatic chuck 110. The chuck 110 is similar to the arbor 10 embodiment of FIGS. 1 through 5 in that it is essentially a female version thereof. Accordingly, for brevity and clarity, some details in common between the two embodiments will be omitted from discussion of the chuck 110.

The chuck 110 includes a body 112 having a cylindrical tube or socket portion 114 and a radially extending mounting flange portion 116. The body 112 is constructed to be bolted to a machine tool spindle (not shown) for co-rotation therewith. The body 112 includes a main fluid passage 122 and branch fluid passages 124, 126 that are constructed to be filled with a pressurized fluid. As is well known in the art, the main fluid passage 122 is supplied with pressurized fluid either by a pump carried by the body 112 or through the machine tool spindle (not shown) by a remote pump. The socket portion 114 is stepped to include a first inner diameter or first inner cylindrical surface 130 and a smaller, second inner diameter or inner cylindrical surface 131. An internal annular recess 128 in the first inner surface 130 partially defines a fluid chamber 132 that is sealed by polymeric rings 134 disposed within annular grooves 136 in sidewalls of the socket portion 114.

A sleeve or diaphragm 138 is adjacent to and disposed within the first inner surface 130 of the socket portion 114 of the body 112 and partially defines the fluid chamber 132. The diaphragm 138 includes an outer cylindrical surface 140 that cooperates with the first inner surface 130 of the mandrel portion 114 of the body 112 and further includes an oppositely disposed inner cylindrical surface 142. The diaphragm 138 is composed of any material that permits radially outward displacement of a mid-section 144 of the diaphragm 138 under fluid pressure thereon, yet enables the diaphragm 138 to retain surface contact with the polymeric rings 134.

A metal sleeve or baffle 146 is adjacent to and disposed within the diaphragm 138. The baffle 146 includes a diaphragm engaging surface or outer surface 148 that cooperates with the inner cylindrical surface 142 of the diaphragm 138 and further includes an oppositely disposed collet engaging surface or inner surface 150. Alternatively, the baffle 146 may be located within an exterior annular relief (not shown) of the diaphragm 138 such that the baffle 146 and diaphragm 138 share a common inside diameter. The baffle 146 includes a displacement relief or slot (not shown in FIG. 6, but like that shown previously in FIGS. 3 and 4) to enable the baffle 146 to displace radially inwardly. The baffle 146 is composed of a material and constructed in a manner that permits inward radial displacement thereof.

A sleeve or collet 158 is adjacent to and disposed within the baffle 146. The collet 158 includes an outer surface 160 that engages the inner surface 150 of the baffle 146 and the second inner surface 131 of the body 112. The collet 158 further includes an oppositely disposed inner surface 162. Alternatively, the collet 158 may include an internal annular relief (not shown) for capturing the baffle 146 such that the baffle 146 and collet 158 share a common outside diameter. As described previously with respect to the first embodiment, the collet 158 is generally tubular or cylindrical and includes a plurality of circumferentially spaced and longitudinally disposed slots or displacement reliefs 166 formed therein such as by milling or electro-discharge machining. The collet 158 is composed of a material and constructed in a manner to permit inward radial displacement thereof.

An annular nose piece 176 caps the socket portion 114 of the body 112. Cap screws 178 thread into the end of the socket portion 114 of the body 112 to hold the nose piece 176 thereto.

In assembly, the resilient polymeric rings 134 are compressed within the socket portion 114 of the body 112 and positioned into the annular grooves 136. The diaphragm 138 is then inserted coaxially within the first inner surface 130 of the socket portion 114 in abutment with a first shoulder 182 of the body 112 and in sealing engagement with the polymeric rings 134 to seal the fluid chamber 132. The baffle 146 is then assembled within the diaphragm 138 and longitudinally centered therealong. The collet 158 is then assembled within the baffle 146, the first inner surface 130 of the socket portion 114, and the second inner surface 131 of the socket portion 114 in abutment with a second shoulder 184 of the body 112. As before, the collet 158 is angularly oriented or clocked with respect to the baffle 146 such that the displacement relief in the baffle 146 is clocked between adjacent displacement reliefs 166 in the collet 158. Finally, the nose piece 176 is assembled over the end of the socket portion 114 of the body 112. The cap screws 178 are then threaded through the end of the nose piece 176 and into the end of the socket portion 114 to secure the assembly together. Accordingly, the socket portion 114 of the body 112 carries the various assembled components described above to constitute the chuck 110.

In use, the workpiece 100 is disposed within the collet 158 until the workpiece 100 engages the second shoulder 184 of the body 112. The workpiece 100 may be a cast iron sleeve, or any other workpiece suitable for mounting in a chuck. To firmly hold the workpiece 100 in the chuck 110, fluid under pressure is provided from an internal or external source through the main fluid passage 122 and branch fluid passages 124, 126 and into the fluid chambers 132. The force of the pressurized fluid radially inwardly displaces the diaphragm 138 which firmly engages and radially inwardly displaces the baffle 146 which, in turn, firmly engages and radially inwardly displaces the collet 158 to urge the collet 158 into firm engagement with an outer surface 104 of the workpiece 100 to firmly hold and accurately locate the workpiece 100 for machining operations to be performed thereon. To remove the workpiece 100 after machining operations, the pressure of the fluid supplied to the chuck 110 is decreased, thereby decreasing the pressure of the fluid in the fluid chamber 132 to thereby relax the diaphragm 138, baffle 146, and collet 158. Thus, the diaphragm 138 acts as a drive member to radially outwardly urge a driven member (collet 158) into engagement with the workpiece 100 and the baffle 146 is an intermediate member to prevent the softer diaphragm material from extruding through the reliefs 166 in the collet 158.

The baffle or retainer designs of the above described arbor and chuck embodiments add a unique and unobvious feature to the art of arbor and chuck design. Under high performance applications in the absence of the baffle, the fluid pressure forces may be such that the polymeric material of the diaphragm will extrude through the displacement reliefs in the collet thereby permanently damaging the arbor and rendering it unfit for further use. The baffle or retainer provides a simple, inexpensive, and effective way to block the polymeric material from extruding through the displacement reliefs in the collet and thereby bolsters the maximum clamping or gripping force of the arbor and chuck. Accordingly, the arbor or chuck will achieve longer tool life and can handle extremely high fluid pressure conditions to provide greater holding power and a wider range of maximum displacement or contraction, without fluid leaks or extrusion of the diaphragm through the collet.

While the forms of the invention herein disclosed constitute a presently preferred embodiment, many others are possible. It is not intended herein to mention all the possible equivalent forms or ramification of the invention. It is understood that terms used herein are merely descriptive, rather than limiting, and that various changes may be made without departing from the spirit or scope of the invention.

The invention claimed is:

1. A workholding apparatus comprising:
   a body;
   at least one drive member carried by said body, said at least one drive member and said body at least partially defining a fluid chamber therebetween for containing a fluid;
   at least one driven member carried by said body, said at least one driven member having a plurality of generally circumferentially spaced apart displacement reliefs therethrough;
   at least one intermediate member interposed between said at least one drive member and said at least one driven member and oriented to cover all of the circumferentially spaced apart displacement reliefs of the driven member to prevent the drive member from being displaced into the displacement reliefs of the driven member, wherein at least part of a fluid chamber, and said drive, driven, and intermediate members being relatively lapped; and whereby said at least one intermediate member prevents said at least one drive member from extruding into said plurality of generally circumferentially spaced apart displacement reliefs in said at least one driven member under fluid pressures of said fluid.

2. The workholding apparatus of claim 1, wherein said at least one drive member is composed of polymeric material, said at least one driven member is composed of a metal material, and said at least one intermediate member is composed of a material harder than said polymeric material.

3. The workholding apparatus of claim 1, wherein said at least one intermediate member includes a displacement relief therein.

4. A workholding apparatus comprising:
a body;
at least one drive member carried by said body, said at least one drive member and said body at least partially defining a fluid chamber therebetween for containing a fluid;
at least one driven member carried by said body, said at least one driven member having at least one displacement relief;
at least one intermediate member interposed between said at least one drive member and said at least one driven member and having a wall thickness between 0.008" and 0.010" inclusive, said drive, driven, and intermediate members being relatively lapped; and
whereby said at least one intermediate member prevents said at least one drive member from extruding through said at least one displacement relief in said at least one driven member under fluid pressure of said fluid.

5. The workholding apparatus of claim 1, wherein said workholding apparatus is an arbor such that the workpiece substantially circumscribes said at least one driven member and the fluid pressure acts through said at least one intermediate member and said at least one drive member to expand said at least one driven member radially outwardly into engagement with the workpiece.

6. The workholding apparatus of claim 1, wherein said workholding apparatus is a chuck such that the workholding apparatus substantially circumscribes the workpiece and the fluid pressure acts through said at least one intermediate member and said at least one drive member to contract said at least one driven member radially inwardly into engagement with the workpiece.

7. An apparatus to releasably retain a workpiece, said apparatus comprising:
a body;
at least one diaphragm carried by said body, said at least one diaphragm defining at least in part a fluid chamber constructed to contain a fluid;
at least one collet having at least one displacement relief, and a workpiece engaging surface, said at least one collet being carried by said body; and
at least one baffle interposed between said at least one diaphragm and said at least one collet and oriented to cover each said displacement relief of said collet to prevent the diaphragm from being displaced into said displacement relief of said collet, wherein at least part of said fluid chamber and said baffle are relatively lapped;

whereby when said fluid in said fluid chamber is pressurized a drive force is transmitted through said at least one diaphragm, said at least one baffle, and said at least one collet to urge said at least one collet into engagement with the workpiece to releasably retain the workpiece, and said baffle prevents said diaphragm from being extruded through said at least one displacement relief in said at least one collet.

8. The workholding apparatus of claim 7, wherein said at least one diaphragm is composed of polymeric material, said at least one collet is composed of a metal material, and said at least one baffle is composed of a material harder than said polymeric material.

9. The workholding apparatus of claim 7, wherein said at least one baffle includes a displacement relief therein.

10. An apparatus to releasably retain a workpiece, said apparatus comprising:
a body;
at least one diaphragm carried by said body, said at least one diaphragm defining at least in part a fluid chamber constructed to contain a fluid;
at least one collet having at least one displacement relief, a diaphragm engaging surface, and a workpiece engaging surface, said at least one collet being carried by said body; and
at least one baffle interposed between said at least one diaphragm and said at least one collet and having a wall thickness between 0.008" and 0.010" inclusive,
whereby when said fluid in said fluid chamber is pressurized a drive force is transmitted through said at least one diaphragm, said at least one baffle, and said at least one collet to urge said at least one collet into engagement with the workpiece to releasably retain the workpiece, and said baffle prevents said diaphragm from being extruded through said at least one displacement relief in said at least one collet.

11. The workholding apparatus of claim 7, wherein said workholding apparatus is an arbor such that the workpiece substantially circumscribes said at least one collet and the fluid pressure acts through said at least one baffle and said at least one diaphragm to expand said at least one collet radially outwardly into engagement with the workpiece.

12. The workholding apparatus of claim 7, wherein said workholding apparatus is a chuck such that said workholding apparatus substantially circumscribes the workpiece and the fluid pressure acts through said at least one baffle and said at least one diaphragm to contract said at least one collet radially inwardly into engagement with the workpiece.

13. An apparatus to releasably retain a workpiece with a generally cylindrical surface, said apparatus comprising:
a body;
at least one polymeric diaphragm carried by said body, said at least one polymeric diaphragm defining at least in part a fluid chamber constructed to contain a fluid;
at least one metal baffle having a displacement relief, a polymeric diaphragm engaging surface, and a metal collet engaging surface, said at least one metal baffle carried by said body with said at least one polymeric diaphragm adjacent to and engageable with said polymeric diaphragm engaging surface; and
at least one metal collet having a plurality of displacement reliefs, an inner surface, and an outer surface, said at least one metal collet carried by said body with said at least one metal baffle interposed between said at least one metal collet and said at least one polymeric diaphragm, one of said inner and outer surfaces being adjacent to and engageable with said metal collet engaging surface of said at least one metal baffle and the other of said inner and outer surfaces of said at least one metal collet being constructed to receive and directly engage the workpiece, said plurality of displacement reliefs being constructed to receive and directly engage the workpiece, said plurality of displacement reliefs being constructed and arranged to enable said at least one metal collet to undergo a change in diameter to engage the workpiece; and said at least one metal baffle being oriented with said at least one metal collet to cover each said displacement relief of said at least one metal collet to prevent said at least one polymeric diaphragm from being displaced into said displacement reliefs of said at least one metal collet;

whereby when the fluid in the fluid chamber is pressurized, the force of the pressurized fluid is transmitted through said at least one polymeric diaphragm, said at least one metal baffle, and said at least one metal collet to urge said at least one metal collet into engagement with the workpiece to hold the workpiece, and said at least one metal baffle prevents said at least one polymeric diaphragm from extruding through said plurality of displacement reliefs in said at least one metal collet under the force of the pressurized fluid.

14. The workholding apparatus of claim 13, wherein said at least one baffle includes a wall thickness between 0.008" and 0.010" inclusive.

15. The workholding apparatus of claim 13, wherein said workholding apparatus is an arbor such that the workpiece substantially circumscribes said at least one driven member and the fluid pressure acts through said at least one baffle and said at least one drive member to expand said at least one driven member radially outwardly into engagement with the workpiece.

16. The workholding apparatus of claim 13, wherein said workholding apparatus is a chuck such that the workholding apparatus substantially circumscribes the workpiece and the fluid pressure acts through said at least one baffle and said at least one drive member to contract said at least one driven member radially inwardly into engagement with the workpiece.

17. A baffle for use with a workholding apparatus, said apparatus including a body, at least one drive member, and at least one driven member, said at least one drive member being carried by said body and defining at least in part a fluid chamber constructed to contain a fluid, said at least one driven member having a plurality of displacement reliefs, a baffle engaging surface, and a workpiece engaging surface, said at least one driven member being carried by said body, said baffle comprising:

an intermediate member interposed between said at least one drive member and said at least one driven member, said intermediate member having at least one displacement relief therein; and said intermediate member covering each of the plurality of displacement reliefs of said at least one driven member to prevent said at least one drive member from being displaced into said plurality of displacement reliefs of said at least one driven member, whereby when said fluid in said fluid chamber is pressurized a drive force is transmitted through said at least one drive member, said intermediate member, and said at least one driven member to urge said at least one driven member into engagement with a workpiece to releasably retain the workpiece, and said intermediate member prevents said drive member from becoming extruded through said at least one displacement relief in said at least one driven member.

18. The baffle of claim 17, wherein said at least one drive member is composed of polymeric material, said at least one driven member is composed of a metal material, and said intermediate member is composed of a material harder than said polymeric material.

19. The baffle of claim 17, wherein said intermediate member includes a wall thickness between 0.008" and 0.010" inclusive.

20. The baffle of claim 17, wherein said workholding apparatus is at least one of an arbor and a chuck.

21. The work holding apparatus of claim 1, wherein said at least one intermediate member includes a wall thickness between 0.008" and 0.010".

22. The work holding apparatus of claim 7, wherein said at least one baffle includes a wall thickness of 0.008" to 0.010".

* * * * *